(12) United States Patent
Kunii et al.

(10) Patent No.: US 7,230,779 B2
(45) Date of Patent: Jun. 12, 2007

(54) ND FILTER AND APERTURE DIAPHRAGM APPARATUS

(75) Inventors: Koki Kunii, Koriyama (JP); Kazutoshi Mukae, Koriyama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 11/128,295

(22) Filed: May 13, 2005

(65) Prior Publication Data

US 2005/0254155 A1 Nov. 17, 2005

(30) Foreign Application Priority Data

May 14, 2004 (JP) .............................. 2004-145541

(51) Int. Cl.
*G02B 5/22* (2006.01)
(52) U.S. Cl. ...................... 359/888; 359/889; 359/588; 359/589; 396/108; 396/164
(58) Field of Classification Search ................ 359/885, 359/888, 889, 588–589, 585; 396/108, 164; 428/689
See application file for complete search history.

(56) References Cited

U.S. PATENT DOCUMENTS 3,943,019 A * 3/1976 Krekeler et al. .............. 156/99
5,479,298 A 12/1995 Yanagi et al.
6,671,109 B2 * 12/2003 Kunii .......................... 359/888
6,952,314 B2 * 10/2005 Yanagi et al. ............... 359/888

FOREIGN PATENT DOCUMENTS

| JP | 59-38701 | 3/1984 |
| JP | 10-96971 | 4/1998 |

* cited by examiner

*Primary Examiner*—Leonidas Boutsikaris
(74) *Attorney, Agent, or Firm*—Roberts, Mlotkowski & Hobbes; Thomas W. Cole (57) ABSTRACT

An ND filter is made of a transparent substrate having a plane. An optical film is formed on the plane of the transparent substrate. The optical film has a lamination structure including a light absorption film and a dielectric film, and has a variable transmission density. A thickness of either the light absorption film or the dielectric film of the lamination structure is changed in an in-plane direction of the transparent substrate so that the transmission density of the optical film is controlled to vary in the in-plane direction. The light absorption film is composed of a material selected from Ti, Cr, Ni, NiCr, NiFe, NiTi and a mixture thereof, and the dielectric film is formed of $SiO_2$, $Al_2O_3$ or a compound thereof.

13 Claims, 9 Drawing Sheets

| FILM DEPOSITION CONDITION | | |
|---|---|---|
| SUBSTRATE TEMPERATURE | | 100°C |
| REACHED VACUUM LEVEL | | $1 \times 10^{-3}$ Pa |
| Ti | EVAPORATION RATE | 1 nm/sec |
| | EVAPORATION VACUUM LEVEL | $4 \times 10^{-3}$ Pa |
| | INTRODUCED GAS | Air (N2:O2=4:1) |
| SiO$_2$ | EVAPORATION RATE | 1 nm/sec |
| | INTRODUCED GAS | — |
| Al$_2$O$_3$ | EVAPORATION RATE | 1 nm/sec |
| | INTRODUCED GAS | — |

ND FILTER AND APERTURE DIAPHRAGM APPARATUS

BACKGROUND OF THE INVENTION

1. Technical Field of the Invention

The present invention relates to an ND filter and an aperture diaphragm apparatus. An ND (Neutral Density) filter is used in a light quantity diaphragm for the purpose of uniformly attenuating the quantity of transmitted light in an overall visible wavelength range. The present invention relates particularly to a density variable ND filter in which a transmission density is continuously changed.

2. Prior Art

In a conventional photographing system, when the luminance of an object is too high, an excessive quantity of light greater than a predetermined quantity might enter into a photosensitive face through the diaphragm even if the diaphragm is adjusted to the smallest diameter (namely, the aperture diameter is adjusted to the smallest). Therefore, practically an ND filter is mounted on the image pickup system to control the quantity of light that enters into the photosensitive face. In this case, the spectral characteristics of the ND filter is designed flat to simply reduce the quantity of incident light hence the uniform transmittance is provided for the overall visible wavelength range as the basic optical performance of the ND filter.

An ND filter having a uniform transmission density has been employed as the light quantity diaphragm of a camera. Recently, an ND filter in which the transmission density is stepwise varied in divided zones is employed as an advanced filter. Furthermore, for a video optical system that requires sequential photographing, a density variable ND filter in which the transmission density is continuously changed is demanded, because a high resolution can be obtained in a wide range of brightness by use of the density variable ND filter, as compared with a single-density ND filter or a multi-density ND filter. The density variable ND filter is disclosed in the following patent documents.

[Patent Document 1] JP-A-Hei 6-95208
[Patent Document 2] JP-A-Hei 10-96971
[Patent Document 3] JP-B-Hei 2-47722
[Patent Document 4] JP-A-2003-043211

According to patent document 1, a master pattern of a ND filter is prepared, which has a reflection density distribution having a predetermined relationship with a transmission density distribution of an ND filter that provides a filtering function for transmitted light when the ND filter is mounted on the aperture blade of an aperture diaphragm apparatus. This master pattern is photographed by a camera using a film which has the transmittance through a film base equal to or greater than 80% and which has a halation prevention layer. Then, the film is developed and is employed as an ND filter. According to patent document 2, by a method of manufacturing an ND filter that is provided for the aperture blade of an aperture diaphragm apparatus, a plastic film containing organic pigments is irradiated by light of high energy, while the amount of irradiated light is changed partially, so that an ND filter having a variable density distribution is prepared. According to patent document 3, an ND filter employs a metal material as an absorption film, and the quantity of transmitted light is continuously changed radially from the center where reflection prevention films are formed. In this ND filter, the absorption film is divided into multiple thin layers, and the divided absorption layers are inserted into the boundaries of the reflection prevention films.

According to patent document 1, the change of the density of the ND filter is provided by differentiating the precipitated amount of silver particles. However, light scattering due to silver particles causes the deterioration of the resolution, and the use of this type of the ND filter is difficult for a recent image pickup system for which a resolution has been increased. For patent document 2, the color decay of the organic pigments, especially, the change of the transmission characteristics under high temperature and high humidity environment is a serious drawback. According to patent document 3, the change of the density is provided by locally inserting metal films having different thicknesses between the reflection prevention films. However, according to this method, the uniform transmission characteristics in the overall visible light wavelength range cannot be obtained, and therefore it is difficult to apply this type of ND filter to the image pickup system.

SUMMARY OF THE INVENTION

While taking various problems of the above described conventional technologies into account, it is one object of the present invention to provide a density variable ND filter that eliminates light scattering, and that has high resistance for an environmental change, and neutral transmission characteristics for a whole visible light wavelength range. The following means are provided to achieve this object. Specifically, the present invention provides an ND filter characterized by comprising: a transparent substrate having a plane; and an optical film being formed on the plane of the transparent substrate, having a lamination structure including a light absorption film and a dielectric film, and having a variable transmission density, wherein a thickness of either the light absorption film or the dielectric film of the lamination structure is changed in the in-plane direction of the substrate, and in accordance with this change, the transmission density of the optical film is controlled to vary in the in-plane direction.

Preferably, the thickness of either the light absorption film or the dielectric film included in the lamination structure is continuously changed or gradated in the in-plane direction of the substrate, and in accordance with this change, the transmission density of the optical film is adjusted so as to continuously vary in the in-plane direction. Furthermore, the material of the light absorption film is selected from Ti, Cr, Ni, NiCr, NiFe, NiTi and a mixture of them, and the dielectric film is formed of $SiO_2$, $Al_2O_3$ or a compound of them. The dielectric film and the light absorption film can be laminated with predetermined thicknesses and in a predetermined order to provide a reflection prevention function. Furthermore, the optical film is obtained by vapor deposition of the light absorption film using a metal material, and the light absorption film contains an oxide of the metal material that is generated while a mixture gas containing oxygen is introduced during the vapor deposition of the light absorption film, and a vacuum level of $1\times10^{-3}$ Pa to $1\times10^{-2}$ Pa is constantly maintained. In this case, after the light absorption film and the dielectric film are laminated, the optical film may be subjected to thermal aging treatment under the oxygen atmosphere containing oxygen of equal to or higher than 10%, and the change of the optical characteristics may be saturated or stabilized. This arranged ND filter can be attached to the diaphragm blade of the aperture diaphragm apparatus.

According to the present invention, basically the ND filter has a lamination structure of the light absorption film and the dielectric film that are formed on the transparent substrate.

This lamination structure does not cause light scattering, and has high resistance to an environmental stress, and neutral characteristics to a whole visible light wavelength range. Since the thicknesses of the light absorption film and the dielectric film of the lamination structure are changed in the in-plane direction of the substrate, the transmission density can be changed in the in-plane direction of the substrate, while the durability and the neutral characteristics are maintained. Therefore, it can be obtained the density variable ND filter which does not cause light scattering and which has high resistance relative to an environmental change and the neutral characteristics relative to a whole visible light wavelength range.

DETAILED DESCRIPTION OF THE INVENTION

Figure 1A:
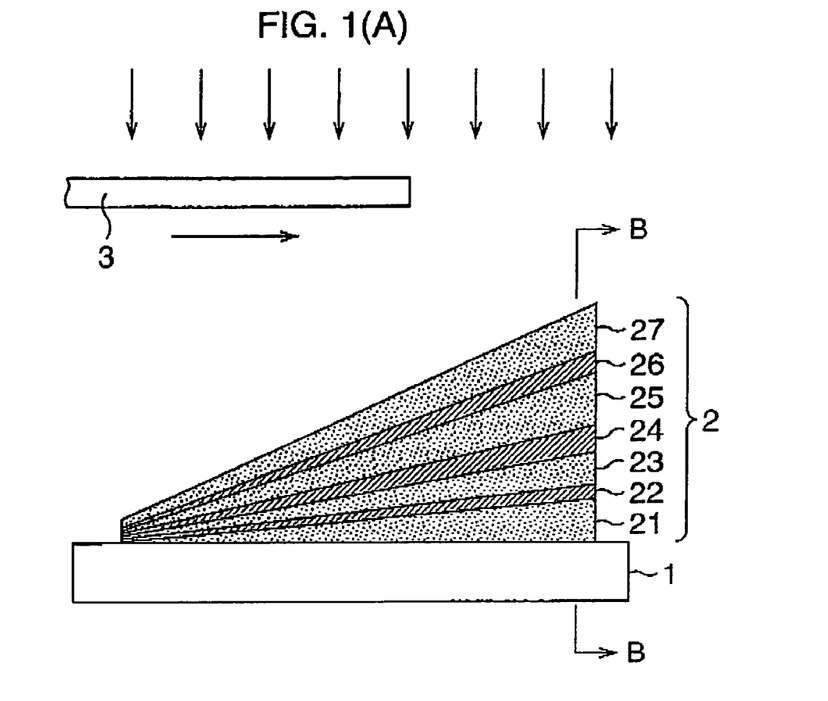
FIGS. 1(A) and 1(B) are a schematic side view and a cross-sectional view of the structure of a density variable ND filter according to the present invention.
Figure 1B:
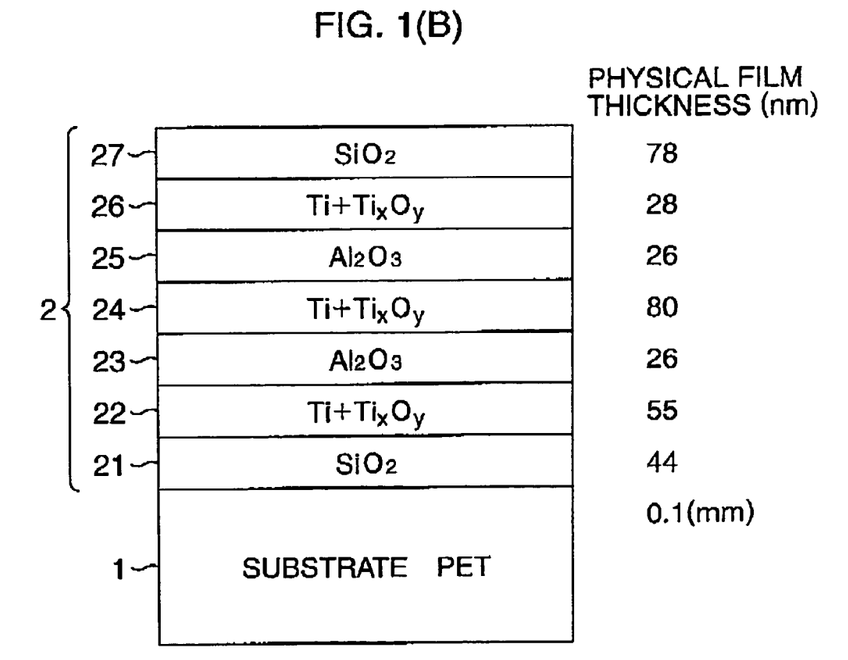

Embodiments of the present invention will now be described in detail while referring to the drawings. FIG. 1 is a schematic side view(A) and a cross sectional view (B) of the structure of a density variable ND filter according to the present invention. As is shown in FIG. 1(A), the ND filter comprises a transparent substrate 1 having a plane and an optical film 2 formed on the substrate 1. The optical film has a lamination structure including layers of light absorption films 22, 24 and 26 and dielectric films 21, 23, 25 and 27. When the thicknesses of the light absorption films and the transparent dielectric films are controlled, a locally adjusted transmission density is obtained. As a feature, the thickness of at least one of the light absorption films 22, 24 and 26 and the dielectric films 21, 23, 25 and 27 of the lamination structure is changed in the in-plane direction of the substrate 1, and in accordance with this change, the transmission density of the optical film 2 is adjusted so as to vary in the in-plane direction. In the embodiment shown in FIG. 1, the thicknesses of all the seven layers constituting the ND filter are changed at the same ratio. It should be noted, however, that the present invention is not limited to this embodiment. The thicknesses need not be changed at the same ratio, or not all the thickness of the films need to be changed. Further, the total number of layers of the lamination structure can be freely determined in accordance with the optical specification.

In this embodiment, the thicknesses of the light absorption films 22, 24 and 26 and the dielectric films 21, 23, 25 and 27 of the lamination structure are continuously changed in the in-plane direction of the substrate 1 (from the left to the right in the drawing), and in accordance with this change, the transmission density of the optical film 2 is adjusted so as to continuously increase from the left to the right in the drawing. In order to continuously change or gradate the thickness of the film in the in-plane direction of the substrate, the shielding effects using a mask 3 can be employed during a film deposition process, such as a vapor deposition process. For example, when the first dielectric film 21 is to be deposited, the mask 3 is moved from the left to the right at a constant speed as indicated by an arrow, while the film deposition is performed at a constant evaporation rate. As a result, the dielectric film 21 that is thin on the left and thick on the right is obtained. This process is repeatedly performed for all the films, and the slanted or tapered structure shown in FIG. 1(A) is obtained. It should be noted that the constant moving of the mask 3 can be performed by using a motor.

FIG. 1(B) shows a schematic cross-sectional structure taken along a line B-B of the ND filter shown in FIG. 1(A). That is, the cross-sectional structure provided for the thickest portion of the ND filter shown in FIG. 1(A), and whose transmission density D is 1.4. As it shown in the drawing, the transparent substrate 1 is made of PET (polyethylene terephthalate) of 0.1 mm thickness. It should be noted, however, that the present invention is not limited to this material, and instead of PET, other polyester film or polycarbonate (PC) film can also be employed. A polyester film such as PET or a polycarbonate film is preferable for an aperture diaphragm: however, so long as the application is not especially limited, transparent glass or plastic can be employed, when needed, as the transparent substrate 1 for a wavelength range to be used. The first dielectric film 21 deposited on the transparent substrate 1 is formed of $SiO_2$, and its physical thickness is 44 nm. The light absorption film 22 formed on the dielectric film 21 is made of metal Ti and oxide $Ti_xO_y$, and its physical thickness is 55 nm. The dielectric film 23 deposited on the light absorption film 22 is made of $Al_2O_3$, and its physical thickness is 26 nm. The light absorption film 24 deposited on the dielectric film 23 is also formed of metal Ti and oxide $Ti_xO_y$, and its physical thickness is 80 nm. The dielectric film 25, the fifth layer deposited on the light absorption film 24, is made of $Al_2O_3$, and its physical thickness is 26 nm. The light absorption film 26 deposited on the dielectric film 25 is also made of metal Ti and oxide $Ti_xO_y$, and its physical thickness is 28 nm. The dielectric film 27, the last seventh layer, is made of $SiO_2$, and its physical thickness is 78 nm. It should be noted, however, that the disclosed lamination structure is an example, and does not limit the scope of the present invention. For optical thin films, generally, a transparent ceramics material is represented as a dielectric film relative to a wavelength to be used. When dielectric films having such a thickness (about several times of a wavelength) that the light interference effects appear are laminated, the optical characteristics (the amount of reflected light, the amount of transmitted light, polarized light and phases) of incident light can be freely adjusted. In this embodiment, by using the layer structure shown in FIG. 1(B), the reflection prevention function is provided for the optical film 2. The light absorption films have a function for literally absorbing light in the wavelength range to be used, and generally, metal is employed in the visible wavelength range. According to this invention, metal oxide is introduced to the metal material to especially improve the optical characteristics and the physical characteristics. Instead of Ti, other metals Cr, Ni, NiCr, NiFe, NiTi and a mixture of them may be selected as the metal material for the light absorption films.

Figure 2:
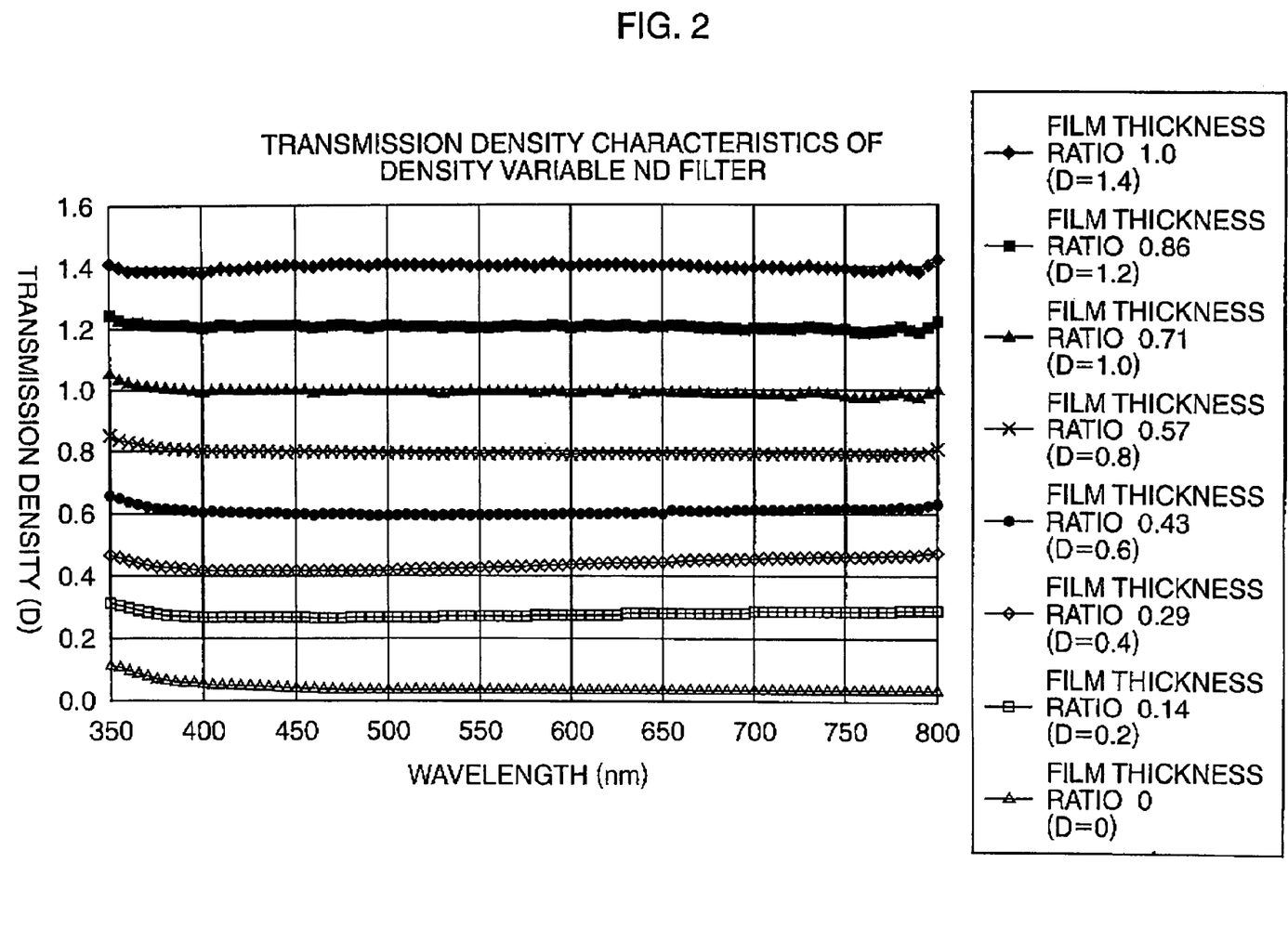
FIG. 2 is a graph showing a transmission density characteristic of the density variable ND filter according to the present invention.

FIG. 2 is a graph showing the transmission density characteristics of the density variable ND filter shown in FIG. 1. The vertical axis represents the transmission density (D), and the horizontal axis represents the wavelength (nm). In this graph, the thickness of the optical film 2 is employed as a parameter, and the total eight levels are designated. The thickest portion of the optical film (shown in FIG. 1(B)) is defined as the thickness ratio of 1.0, and hereinafter, the thickness ratios of 0.86, 0.71, 0.57, 0.43, 0.29, 0.14 and 0.00 are designated. As is apparent from the graph, the portion having the thickness ratio of 1.0 has density D=1.4, and thereafter, the transmission density (D) substantially decreases in proportion to the thickness. Furthermore, for all the thicknesses, the transmission density characteristic is almost flat in the visible wavelength range. For the ND filter of the invention, the quantity of the transmitted light can be uniformly attenuated in the overall visible wavelength range.

Figure 3:
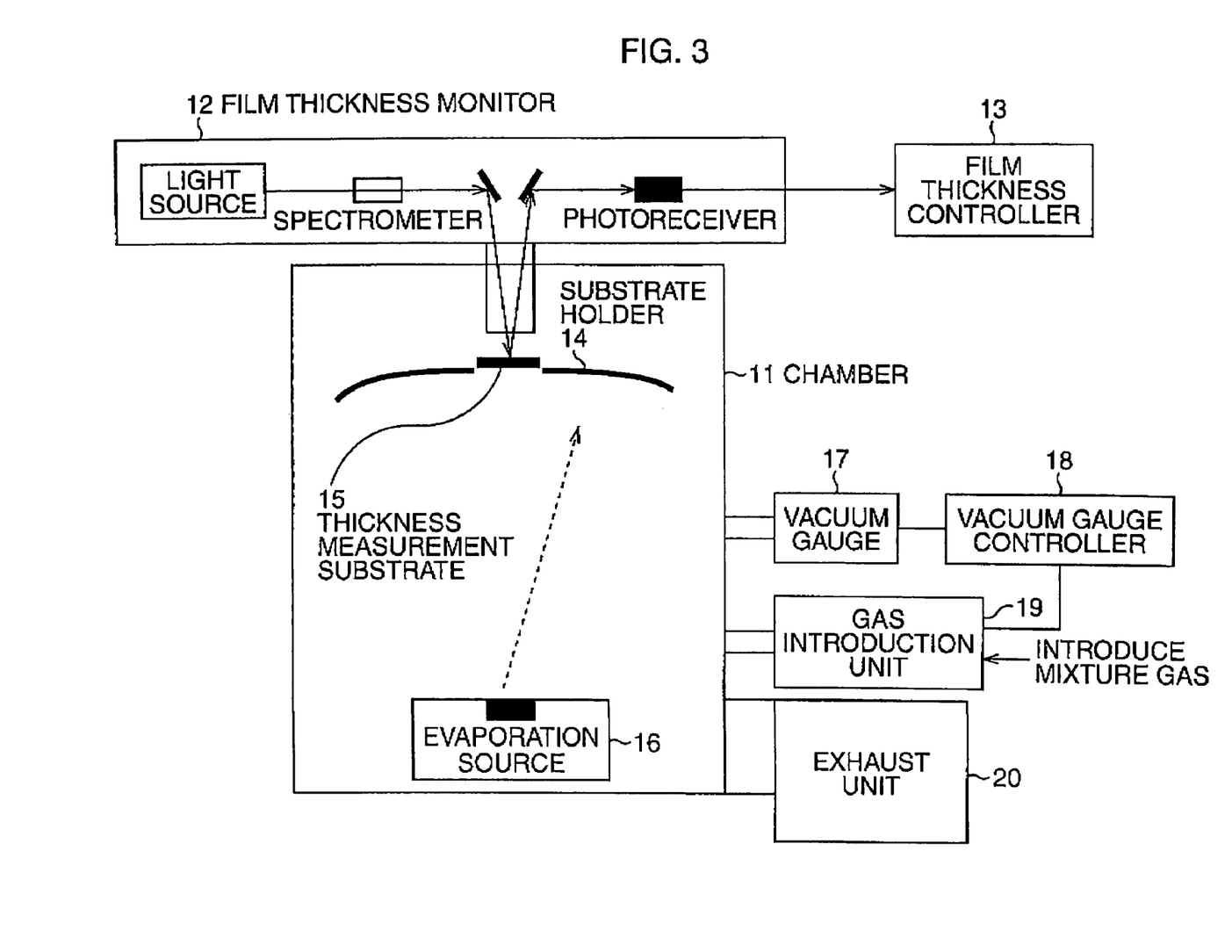
FIG. 3 is a schematic block diagram showing a vacuum evaporation apparatus that is employed for preparation of the density variable ND filter according to the present invention.

FIG. 3 is a schematic block diagram showing an example of vacuum evaporation apparatus used for preparing the density variable ND filter shown in FIG. 1. In addition to the vacuum evaporation method, a method for forming a fine film, such as the ion plating method, the ion assist method or the sputtering method, can also be employed as the film deposition method for producing the ND filter. As is shown in FIG. 3, this evaporation apparatus is constituted by mainly a vacuum chamber 11, and a film thickness monitor 12 and a film thickness controller 13 are attached above the chamber 11. A substrate holder 14 for securely supporting a substrate to be processed, a substrate 15 for measuring the thickness of a film, and an evaporation source 16 are arranged inside the chamber 11. Although not shown, a film thickness control mask shown in FIG. 1 is located between the evaporation source 16 and the substrate holder 14. The film thickness monitor 12 includes a light source, a spectrometer and a photoreceiver. Light emitted by the spectrometer enters the thickness measurement substrate 15, the light that is reflected by the thickness measurement substrate 15 is transmitted into the photoreceiver, and the output thereof is transmitted to the film thickness controller 13. In this manner, since the film thickness is monitored in real time, the light absorption films and the dielectric films having desired thicknesses are deposited on the substrate. At this time, the above described mask is moved in synchronization with the real-time monitoring of the film thickness, so that the light absorption films and the dielectric films, in which the thicknesses are monotonously changed in the in-plane direction of the substrate, can be deposited.

A vacuum gauge 17, a vacuum gauge controller 18, a gas introduction unit 19 and an exhaust unit 20 are connected to the chamber 11. In this embodiment, the APC system is employed to maintain the constant vacuum level in the chamber 11. Specifically, the feedback is performed through the vacuum gauge 17 and the vacuum gauge controller 18 to control the gas introduction unit 19, and to regulate the amount of a mixture gas to be introduced into the chamber 11. It should be noted, however, that the present invention is not limited to this system, and a system for employing a needle valve to maintain a constant amount of introduced gas may be used.

Figure 4:
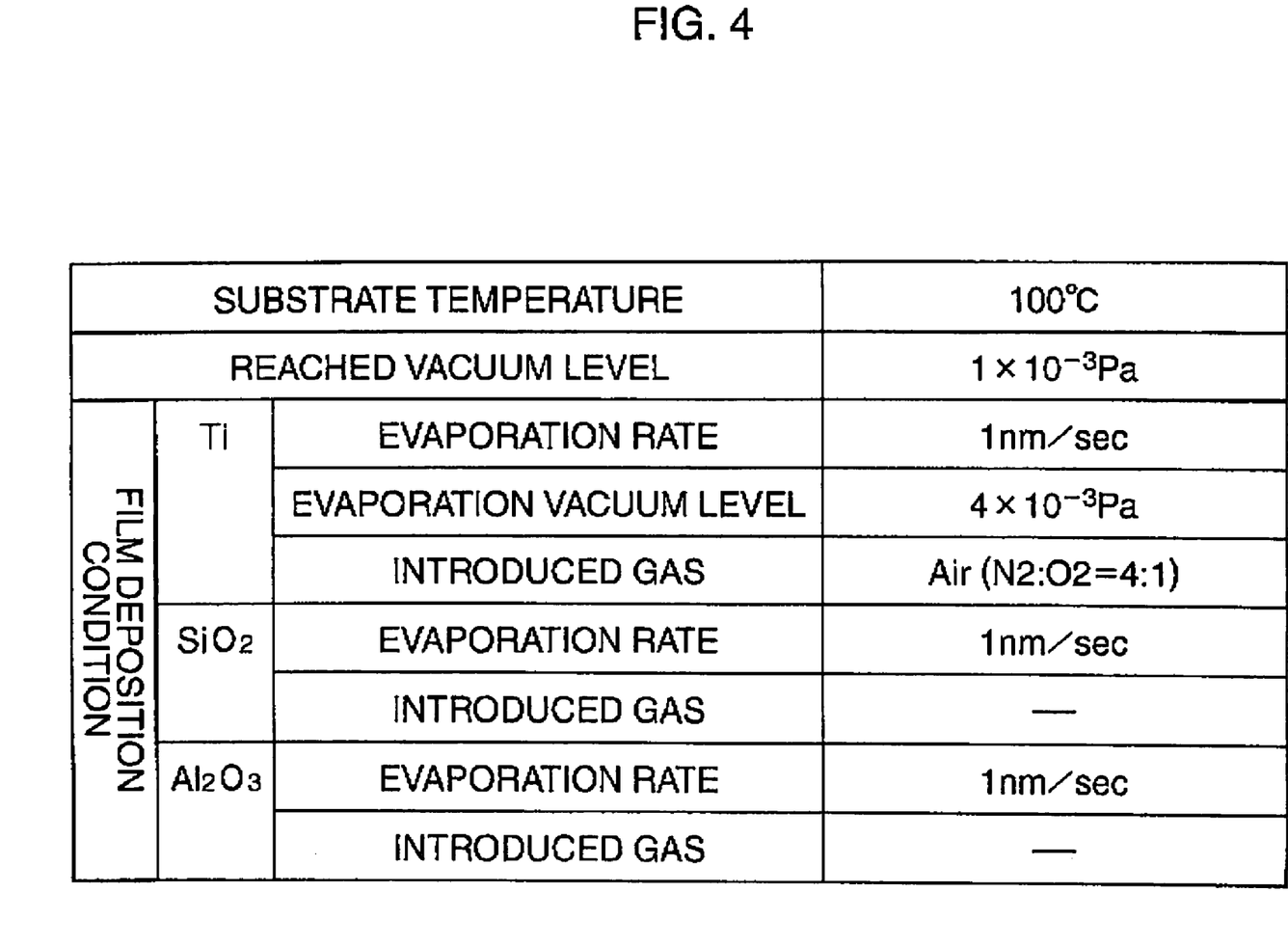
FIG. 4 is a table diagram showing film deposition condition for the density variable ND filter according to the present invention.

FIG. 4 is a table showing film deposition conditions when the optical film shown in FIG. 1 is prepared by using the vacuum evaporation apparatus shown in FIG. 3. As is shown in FIG. 4, the substrate temperature is 100° C., and the vacuum level that is reached in the chamber 11 is set to $1 \times 10^{-3}$ Pa. In order to deposit the light absorption films 22, 24 and 26, Ti is employed as the source material, and the evaporation rate is set to 1 nm/sec. Further, in this embodiment, air where nitrogen and oxygen are mixed at the ratio of 4:1 is employed as a mixture gas that is introduced for evaporation of Ti. It should be noted, however, that the present invention is not limited to this gas, and generally, a mixture gas that contains oxygen at a ratio of 50% or less is employed. Further, the vacuum level when the mixture gas containing oxygen is introduced is set to $4 \times 10^{-3}$ Pa. It should be noted, however, that the present invention is not limited to this. Generally, when the vacuum level is maintained between $1 \times 10^{-3}$ Pa to $1 \times 10^{-2}$ Pa, light absorption films that have preferable optical characteristics and physical characteristics and that are made of a mixture of metal and the metal oxide can be deposited. For deposition of the dielectric films 21 and 27, $SiO_2$ is employed as the evaporation source, and the evaporation rate is set to 1 nm/sec. A reactive gas is not especially introduced for deposition of $SiO_2$. For the dielectric films 23 and 25, $Al_2O_3$ is employed as the evaporation source, and the evaporation rate is set to 1 nm/sec. Also in this case, the reactive gas is not employed. As is described above, when the metal material, such as Ti, is employed, and the partial pressure of oxygen in the mixture gas that is introduced during the film deposition is adjusted, the light absorption films consonant with the requested characteristics can be obtained as the metal films or the mixture of the metal films and the oxide films. In order to stabilize the unstable elements contained in the light absorption films, the heating process may be performed after the film deposition. For example, after the light absorption films and the dielectric films are laminated, these films are heated under the oxygen atmosphere containing 10% of oxygen or higher, so that the change of the optical characteristics can be saturated by this thermal aging treatment.

Figure 5:
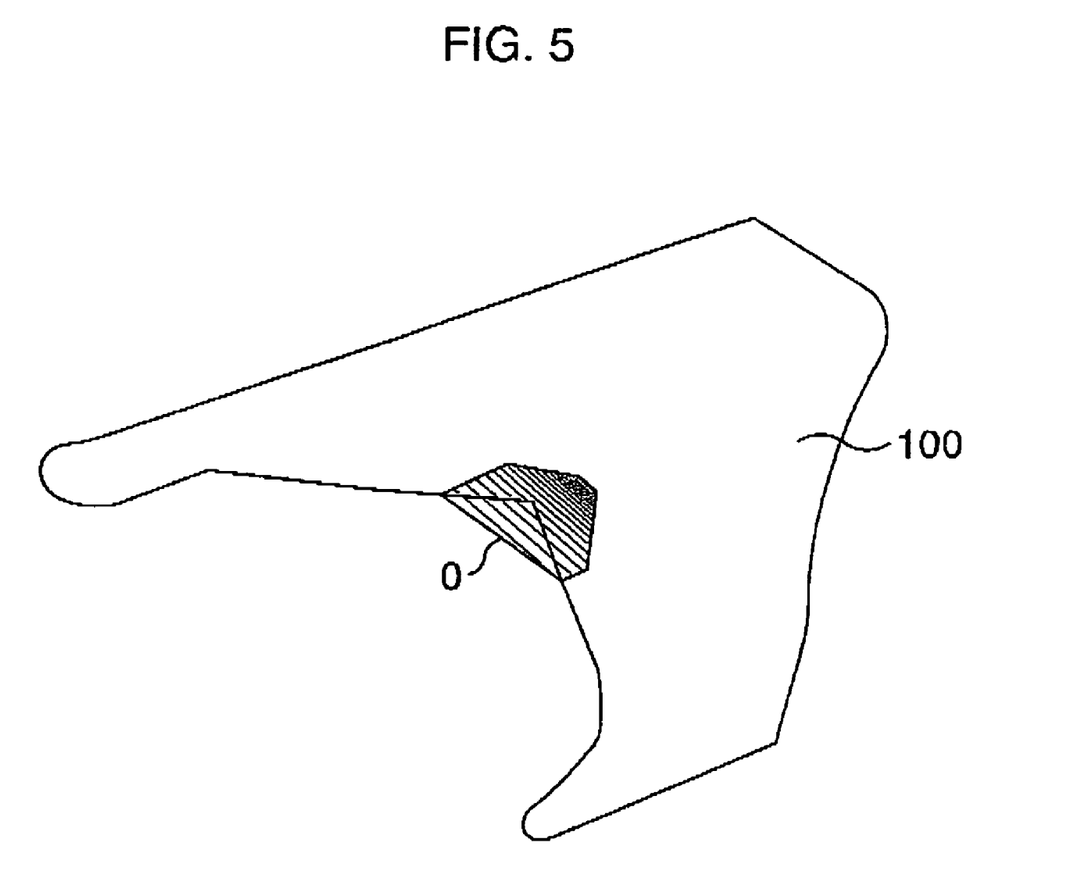
FIG. 5 is a schematic diagram showing an aperture diaphragm apparatus for a camera that employs the density variable ND filter according to the present invention.

FIG. 5 is a schematic diagram showing an example where the density variable ND filter of the invention is attached to the diaphragm blade of an aperture diaphragm apparatus for a camera. A diaphragm blade 100 is shown in FIG. 5, and reference numeral 0 denotes a density variable ND filter according to the invention. As is shown in FIG. 5, the transmittance of the density variable ND filter 0 is continuously reduced outwardly from the center of the diaphragm aperture. That is, the transmittance of the density variable ND filter 0 is continuously and linearly reduced in proportion to the distance from the light axis of the image pickup optical system.

The aperture diaphragm is provided to control the quantity of light that enters into a silver halide film or a solid-state image pickup device such as CCD, and is reduced when a view field is bright. Therefore, the diaphragm is reduced under fine weather or when photographing an object with a high luminance, and tends to be adversely affected by hunting phenomenon of the diaphragm, or light diffraction, so that deterioration of the imaging performance occurs. As a countermeasure, the ND filter is attached to the diaphragm blade to increase the aperture of the diaphragm even when the brightness of the view filed is relatively high. Recently, as the sensitivity of the image pickup device is increased, the density of the ND filter is increased, and the transmittance of light is reduced more, so that the aperture of the diaphragm is increased even when the brightness of the view field is the same. However, as a problem, when the density of the ND filter is increased, a difference between the quantity of light passed through the filter and the quantity of light not passed through the filter is increased, and the resolution is degraded. In order to resolve this problem, the density variable ND filter shown in FIG. 5 is employed. That is, for the density of the ND filter, when the structure where the transmittance of the ND filter is continuously and linearly increased toward the center of the light axis is employed, the reduction of the resolution is prevented.

Figure 6:
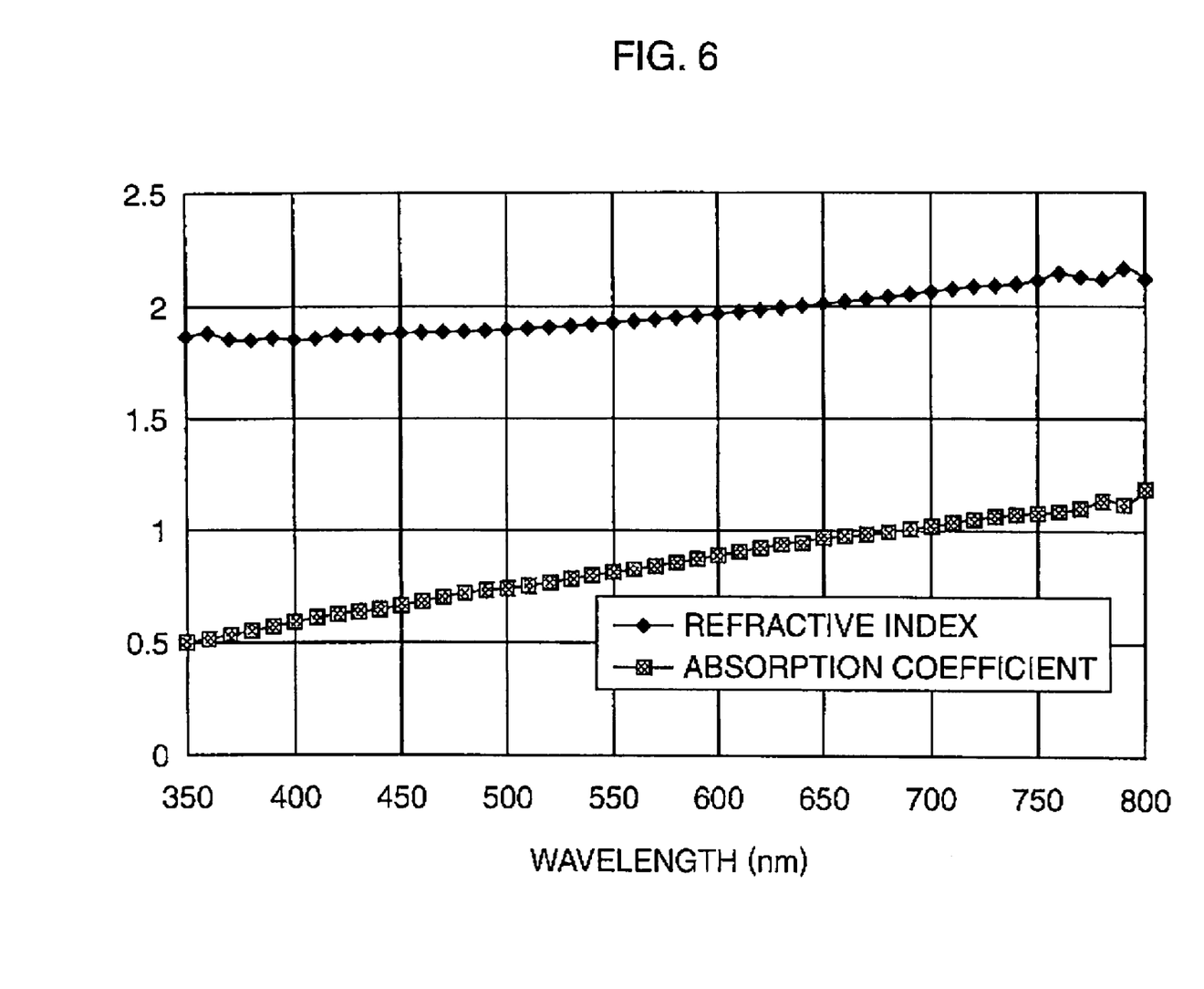
FIG. 6 is a graph showing the optical characteristics of light absorption films included in an optical film.

In this embodiment, the lamination structure where the light absorption films and the dielectric films are alternately laminated is employed as the optical film that constitute the ND filter. Especially for the light absorption films, the reliability and durability of the density variable ND filter is ensured for an extended period of life time by employing the composition including the metal material and the oxide of that metal. This point will now be explained for the reference, and the details are described in patent document 4. First, FIG. 6 is a graph showing the optical characteristics of the light absorption film deposited under the conditions indicated in FIG. 4. The horizontal axis represents the wavelength, and the vertical axis represents the refractive index and the absorption coefficient. As is apparent from the graph, there is a trend that, in the visible wavelength range, the absorption coefficient of the light absorption film made of the mixture of T and $Ti_xO_y$ is increased as the wavelength becomes long.

Figure 7:
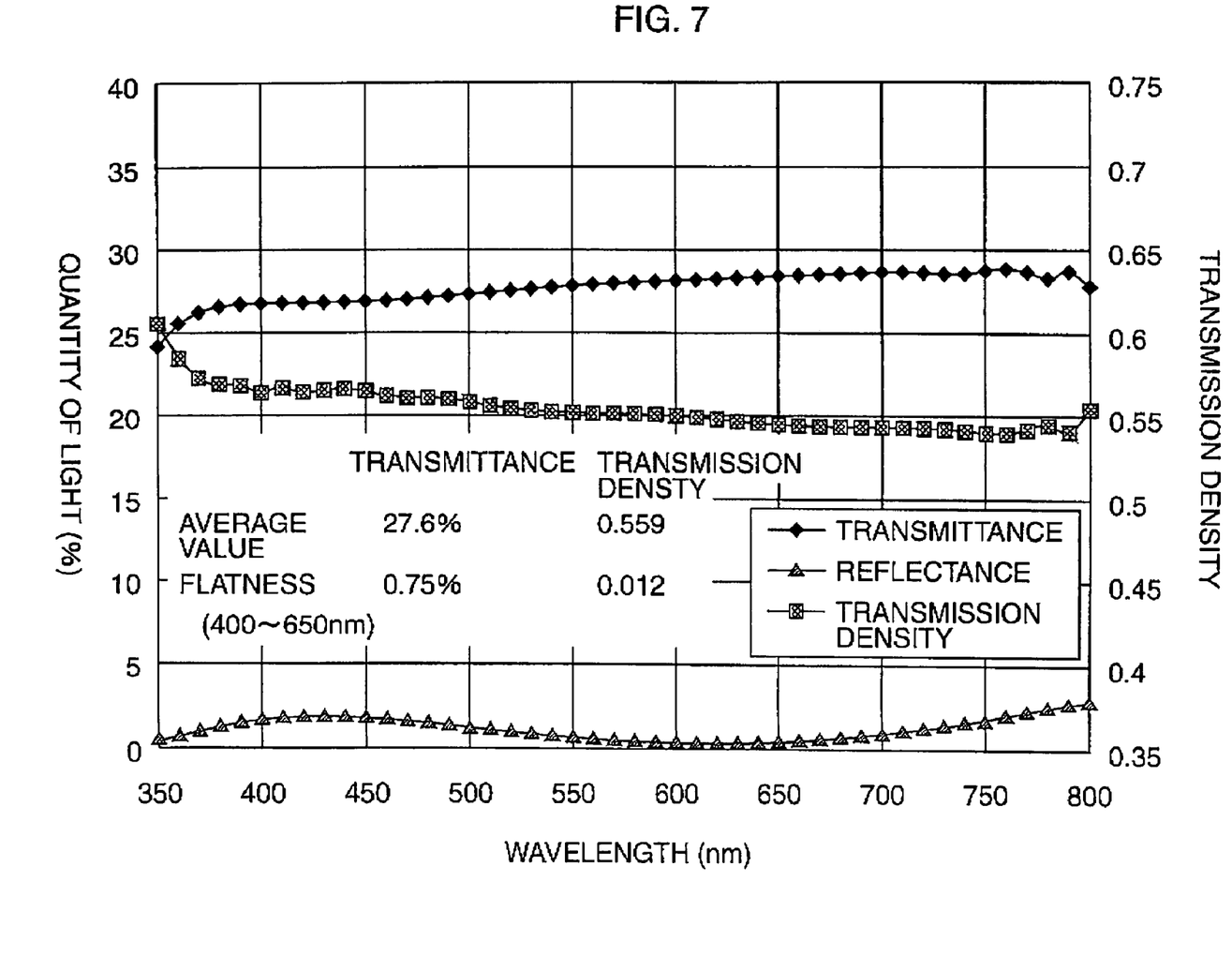
FIG. 7 is a graph showing the optical characteristics of the optical film.

FIG. 7 is a graph showing the optical characteristics of the optical film having five layers that is prepared under the film deposition conditions shown in FIG. 4. The horizontal axis represents the wavelength in the visible wavelength range, and the left vertical axis represents the quantity of light (%) that indicates the scales of a reflectance and a transmittance, while the right vertical axis represents the transmission density. In FIG. 7, the simulation results obtained at the design stage are shown, instead of the characteristics of the optical film that is actually prepared. It is ideal that the transmittance appears finally flat in the overall visible wavelength range. At the design stage, while taking into account the affect of the heat process to be performed later, the transmittance is gradually increased from the short wavelength side to the long wavelength side. This is because, as the characteristics of the optical film, it is predicted that there is a trend that, after the heat process is performed, the transmittance is increased toward the short wavelength side in the visible wavelength range.

Figure 8:
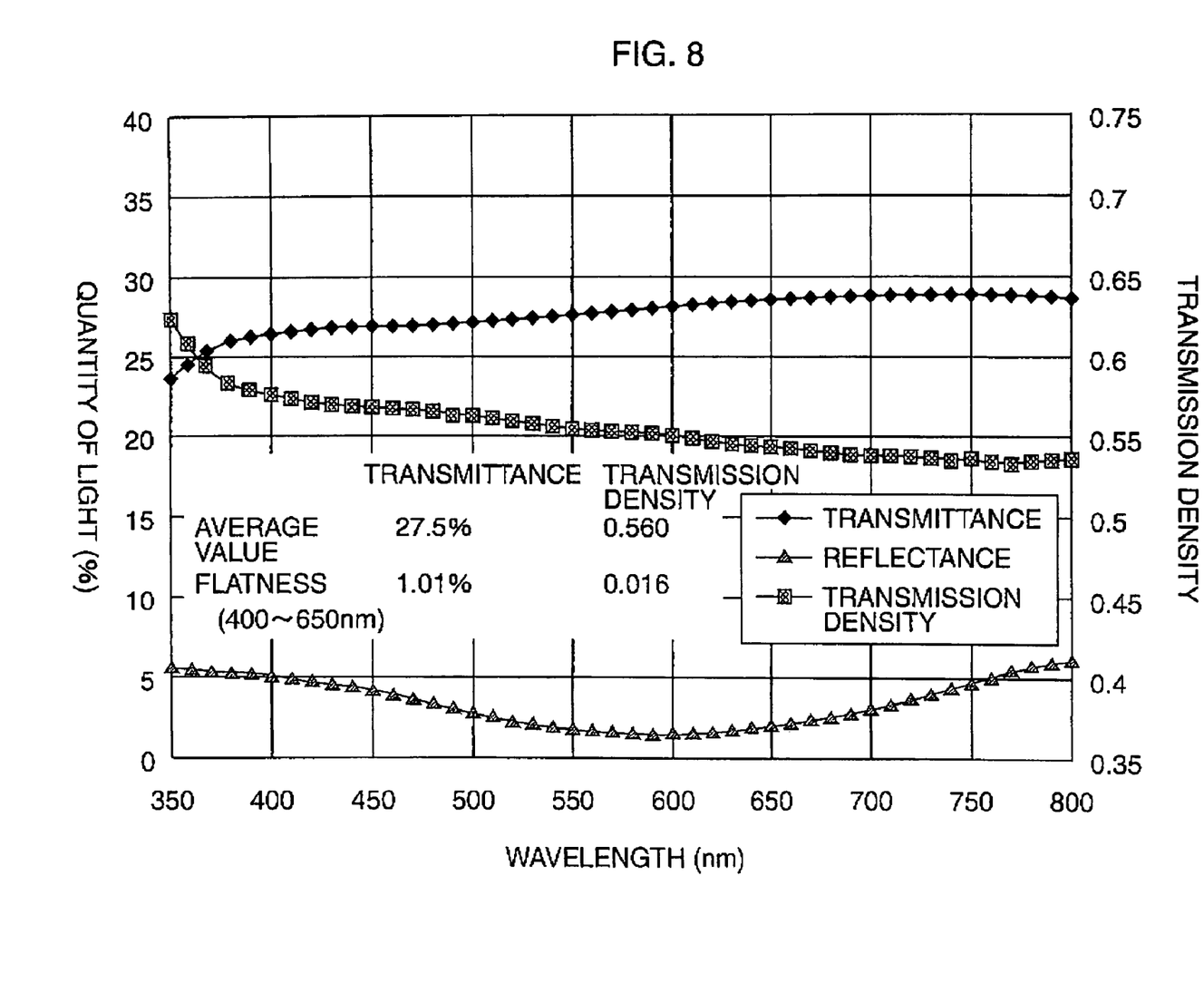
FIG. 8 is a graph showing the optical characteristics of the optical film.

In FIG. 8 shows the initial characteristics of the optical film that is actually deposited under the film deposition conditions shown in FIG. 4. In order to easily understand the characteristics, the reflectance, the transmittance and the transmission density are measured as well as in FIG. 7. As it is apparent from the graph, the optical characteristics substantially same as its design are obtained, and the transmittance is gradually increased from the short wavelength side to the long wavelength side.

Figure 9:
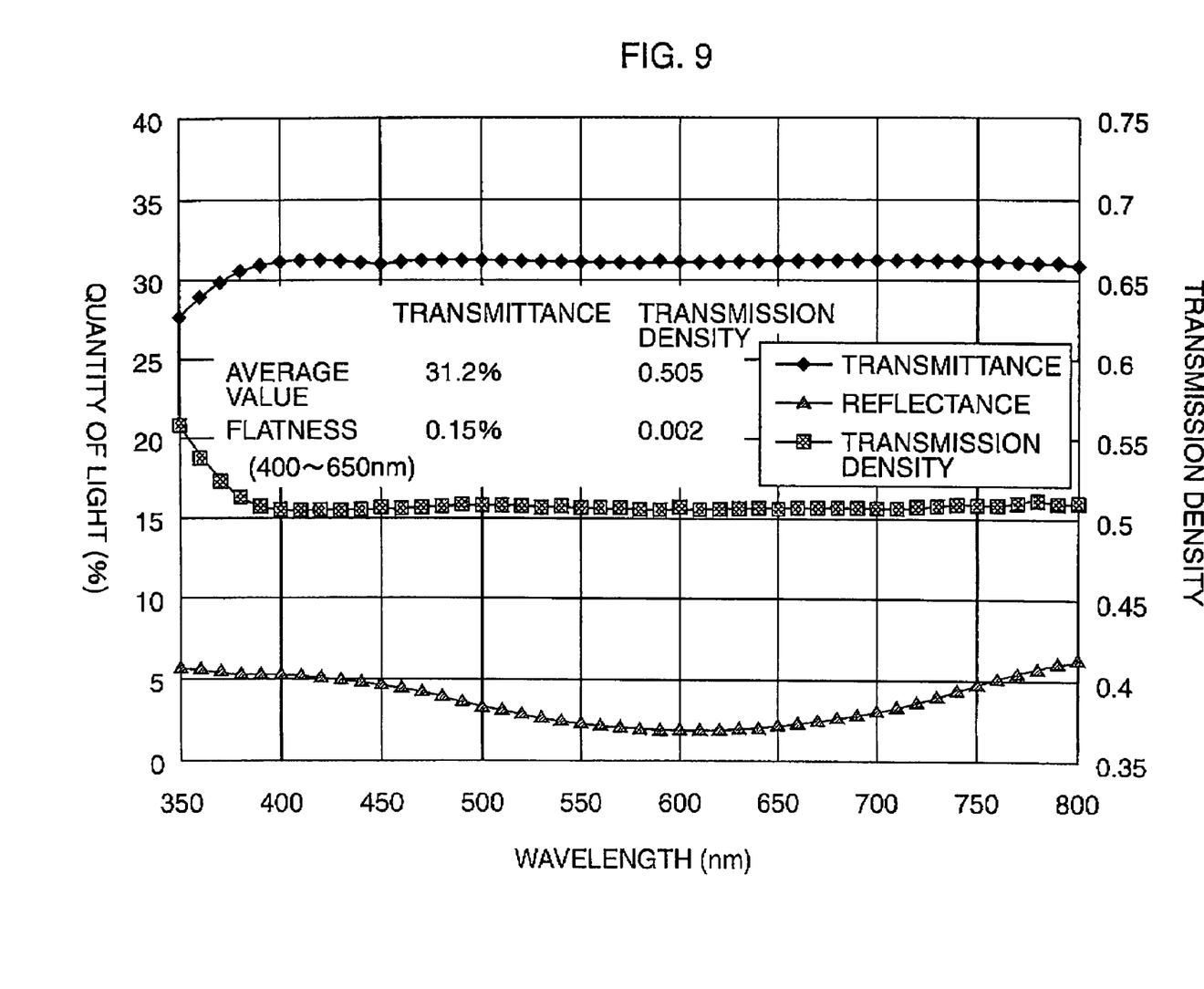
FIG. 9 is a graph showing the optical characteristics of the optical film.

The optical characteristics obtained after the heat process are shown in FIG. 9. In order to understand the characteristics, the transmittance, the reflectance and the transmission density are measured, as well as in FIGS. 7 and 8. As is shown in the graph, after the heat process has been performed, the optical film can be obtained where the transmitted light is uniformly reduced throughout the visible wavelength range, without any wavelength dependency, and the reflection on the surface is suppressed. As is described above, at the initial stage, the transmittance is set in advance to be increased gradually from the short wavelength side to the long wavelength side, so that, after the heat process is completed, the change of the optical characteristics is compensated for. By optimizing the order for depositing the dielectric films and the light absorption films and the thicknesses of these films that constitute the lamination structure, the above described design can be freely obtained. When the heat process is performed, the trend that the transmittance is increased from the long wavelength side to the short wavelength side occurs. Thus, the initial deviation can be canceled, and as a result, the extremely flat transmission characteristic can be obtained in the visible wavelength range.

The invention claimed is:

1. An ND filter comprising:
a transparent substrate having a plane and a substantially uniform thickness; and
an optical film formed on the plane of the transparent substrate and having a maximum and a minimum thickness, the optical film having a lamination structure including layers of a light absorption film and a dielectric film, and having a variable transmission density, wherein
a thickness of at least a top layer of either the light absorption film or the dielectric film of the lamination structure changes continuously and linearly along a single in-plane direction of the transparent substrate so that the transmission density of the optical film is controlled to vary continuously and linearly along the single in-plane direction, the transmission density characteristics being a constant for all visible wavelengths at every point along said single in-plane direction, and the reflectance characteristics being on average less than 5% across all visible wavelengths wherein
the maximum thickness of the optical film is less than said thickness of said transparent substrate.

2. The ND filter according to claim 1, wherein the light absorption film is composed of a material selected from Ti, Cr, Ni, NiCr, NiFe, NiTi and a mixture thereof, and the dielectric film is formed of $SiO_2$, $Al_2O_3$ or a compound thereof.

3. The ND filter according to claim 1, wherein the dielectric film and the light absorption film are successively laminated with predetermined thicknesses in a predetermined order to prevent reflection of light incident to the plane of the transparent substrate.

4. The ND filter according to claim 1, wherein the light absorption film is formed by vapor deposition of a metal material, and contains an oxide of the metal material which is generated while a mixture gas containing oxygen is introduced during the vapor deposition of the light absorption film, and a vacuum level is maintained in the order of $1 \times 10^{-3}$ Pa to $1 \times 10^{-2}$ Pa during the vapor deposition.

5. The ND filter according to claim 4, wherein the optical film is subjected to thermal aging treatment under a gaseous atmosphere containing 10% or more of oxygen so that optical characteristics of the optical film is saturated.

6. An aperture diaphragm apparatus having a diaphragm blade attached with the ND filter according to claim 1.

7. The ND filter according to claim 1, wherein said dielectric layers are formed from a transparent ceramics material, and wherein the thickness of all of said dielectric layers continuously and linearly changes in said single in-plane direction.

8. The ND filter according to claim 1, wherein said optical film has a lowermost dielectric layer formed on said trans parent substrate, and an uppermost layer formed by a dielectric layer, and wherein the thickness of said uppermost layer continuously and linearly changes in said single in-plane direction.

9. The ND filter according to claim 8, wherein the thickness of said lowermost dielectric layer continuously and linearly changes in said single in-plane direction.

10. The ND filter according to claim 1, wherein all the thickness of the layers of the light absorption film and the dielectric film continuously and linearly change in said single in-plane direction at the same ratio.

11. The ND filter according to claim 1, wherein the minimum thickness of said layer whose thickness changes continuously and linearly is equal to or greater than 14% of the maximum thickness.

12. The ND filter according to claim 1, wherein only some of said layers of light absorption film and dielectric film have a thickness that changes linearly and continuously in said single in-plane direction.

13. The ND filter according to claim 1, wherein the optical film is wedge shaped.

* * * * *